Patented Dec. 5, 1944

2,364,178

UNITED STATES PATENT OFFICE 2,364,178

AMINOALKYLATION OF NITROGEN DERIVATIVES

Alexander L. Wilson, Sharpsburg, Pa., assignor to Carbide and Carbon Chemicals Corporation, a corporation of New York No Drawing. Application February 4, 1943, Serial No. 474,697

10 Claims. (Cl. 260—583)

The aminoalkylation of ammonia and amines by reaction with 1,2-alkylene imines has previously been accomplished as described in my co-pending applications Serial Nos. 395,024 and 395,025, filed May 24, 1941, now Patents Nos. 2,318,729 and 2,318,730.

According to this invention, beta-aminoalkyl nitrogen derivatives are prepared by the reaction of beta-aminoalkyl hydrogen sulfates with basic nitrogen derivatives, such as ammonia and water-soluble primary or secondary amines, in the presence of an aqueous solution of an inorganic metal base. Typical beta-aminoalkyl hydrogen sulfates which are employed in the practice of this invention may be represented by the formula:

where $R_1$, $R_2$, $R_3$ and $R_4$ represent hydrogen or lower alkyl groups. These beta-aminoalkyl monosulfuric acid esters may be prepared by the reaction of sulfuric acid with a beta-aminoalcohol, such as ethanolamine, isopropanolamine, 2-amino-1-butanol and 2-amino-2-methyl-1-propanol.

As the other reactant, any water-soluble basic nitrogen derivative having at least one reactive hydrogen atom attached to a basic nitrogen atom may be employed (hereafter referred to as "basic nitrogen compounds"). The more useful of such basic compounds may be represented by the formula $R_5R_6NH$, where $R_5$ and $R_6$ stand for hydrogen, lower alkyl, alkoxyalkylene, hydroxyalkyl, aminoalkyl, alkyliminoalkylene, carboxyalkyl, aminoalkyloxyalkylene or $R_5$ and $R_6$ together may represent part of a ring compound including a basic nitrogen atom to form water-soluble cyclic nitrogen derivatives, such as morpholine or piperazine compounds. A basic nitrogen atom may be defined as one to which an acid may be added to form a salt.

The general reaction of this invention may be represented as follows, where $R_1$, $R_2$, $R_3$, $R_4$, $R_5$ and $R_6$ have the same significance as above and sodium hydroxide is employed as the inorganic base.

$$HNR_1.CR_2R_3CHR_4.SO_4H + R_5R_6NH + 2NaOH \rightarrow$$
$$HNR_1.CR_2R_3CHR_4.NR_5R_6 + Na_2SO_4 + 2H_2O$$

In less generalized form, a specific reaction between aminoethyl hydrogen sulfate and ammonia may be represented as follows:

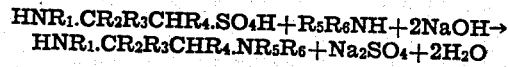

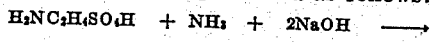

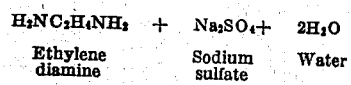

From the above equations, it is apparent that the over-all reaction involves the condensation of the aminoalkyl radical of the beta-aminoalkyl hydrogen sulfate with the basic nitrogen derivative to form a polyamine, accompanied by the formation of water and an inorganic sulfate. By employing large molar proportions of the beta-aminoalkyl hydrogen sulfates relative to the basic nitrogen compounds, an additional reaction between the polyamine first formed and the beta-aminoalkyl hydrogen sulfate may occur to form higher polyamines.

The mechanism of the reaction which occurs is not known, and it was quite unexpected to find that beta-aminoalkyl hydrogen sulfates were capable of a reaction of the type described, as it is known that alkyl hydrogen sulfates are poor alkylating agents, and, in any event, aminoalkyl hydrogen sulfates are characterized by the properties of an aminoacid, rather than by those typical of an alkylsulfuric acid.

It is possible that alkylene imines are first formed in situ, under the reaction conditions set forth, and that these imines react with the basic nitrogen compounds to form beta-aminoalkyl derivatives in a manner similar to that described in my copending applications referred to above. Whatever the mechanism of the reaction may be, it has been found that the process of this invention provides distinct advantages over the preparation of beta-aminoalkyl nitrogen derivatives by the direct reaction of alkylene imines with basic nitrogen compounds. In the first place, the preparation and recovery of the alkylene imines from the beta-aminoalkyl hydrogen sulfates is eliminated, a process in which the recovery of the alkylene imines in good yields is somewhat difficult. In addition, the handling and storage of the toxic, volatile and readily polymerizable alkylene imines are avoided. More significantly, however, there is no appreciable diminution, but generally an increase, in the yield of beta-aminoalkyl nitrogen derivatives from the beta-aminoalkyl hydrogen sulfates, from the overall yield obtained by the intermediate production of the alkylene imines and their further reaction with basic nitrogen compounds. Of equal importance is the fact that little or no polymerized alkylene imines are formed in the process of this invention. In addition, the efficiency of the present process is higher, considering a beta-aminoalcohol as the starting material in the synthesis, since the by-products of the reactions employing beta-aminoalkyl hydrogen sulfates, namely the corresponding beta-aminoalcohols, can be recovered to a large extent and utilized to make the beta-aminoalkyl hydrogen sulfates. Beta-aminoalcohols per se are not appreciably recovered in unreacted form in the process employing alkylene imines.

Careful study of the reaction of this invention has disclosed certain preferred operating conditions, but the invention is not limited to these exact conditions. It is desirable that the inorganic base be present to the extent of two molar equivalents per mol of the beta-aminoalkyl hydrogen sulfate. Excess quantities of the base, except to neutralize acidic groups that may be present, are undesirable and reduce the efficiency of the reaction. A portion of the base may be added during the course of the reaction. Any water-soluble inorganic metal base may be employed, such as sodium hydroxide, potassium hydroxide, barium hydroxide or lithium hydroxide. Weakly basic, water-insoluble metal hydroxides are excluded from the scope of the invention.

The preferred operating temperatures are from about 90° to 200° C., and the reaction is preferably conducted under pressure, especially where volatile reactants such as ammonia and the low-boiling amines are employed.

The presence of water seems to be required for the reaction, and best yields are obtained at relatively high dilution of the reactants as shown in the examples. The ratio of the basic amine to the beta-aminoalkyl hydrogen sulfate ester determines the respective yields of monoaminoalkylated and polyaminoalkylated products; high ratios favoring the production of the former products.

The following examples will illustrate the practice of the invention:

EXAMPLE 1

*Preparation of ethylene diamine*

The following reactants were charged to a cooled autoclave:

Aminoethyl hydrogen sulfate (99.5%)......... 37.0 gms. (0.26 mol)
Aqueous sodium hydroxide (47%)............. 44.4 gms. (0.52 mol)
Aqueous ammonia (26%)...................... 340.0 gms. (4.9 mols)

The reaction was conducted for five hours at 125° to 135° C., the pressure being 450 to 500 p. s. i. The dilute reaction product was freed of ammonia and complete hydrolysis of any residual aminoethyl sulfate was assured by adding the dilute solution under reflux to 200 grams of a heated 47% aqueous solution of sodium hydroxide. The water and amines were next distilled over by concentrating the solution until its boiling point was 160° C., and the remaining amines were removed by a steam distillation. The total aqueous distillate was redistilled to remove the last traces of ammonia, and to recover ethylene diamine and the other amines formed in the reaction. The yield of amines based on the amino-ethyl hydrogen sulfate charged was as follows:

| Product | Yield |
|---|---|
| | Per cent |
| Ethylene diamine | 61.5 |
| Diethylene triamine | 16 |
| Tetra- and pentaethylene polyamines | 9 |
| Monoethanolamine | 7 |
| Hydroxyethyl ethylene diamine | 2 |
| Total amine yield | 95.5 |

EXAMPLE 2

*Preparation of hydroxyethyl ethylene diamine*

In the presence of an excess amount of caustic, small amounts of free ethylene imine appear to be formed in the reaction mixture, and this is the reason why theoretical amounts only of the inorganic metal base are preferred in the practice of the invention. This is illustrated by the following example in which the reactants and diluents were as follows:

Aminoethyl hydrogen sulfate............ 564 grams (4 mols)
Monoethanolamine...................... 1220 grams (20 mols)
Sodium hydroxide...................... 800 grams (20 mols)
Water................................. 800 grams The reactants were heated under reflux for eight hours at 130° C. After distilling off 400 c. c. of aqueous solution, the residue was filtered from sodium sulfate. The filtrate was then steam distilled at 160° C. to separate the rest of amines. The total aqueous distillate was then fractionally distilled to yield the following products:

| Product | Yield |
|---|---|
| | Per cent |
| Hydroxyethyl ethylene diamine | 41 |
| Ethylene imine | 1 |

EXAMPLE 3

*Preparation of diethylene triamine*

The following materials were charged to a distillation flask:

Ethylene diamine............................ 300 grams (5 mols)
Aminoethyl hydrogen sulfate................. 141 grams (1 mol)
Water....................................... 993 grams
Sodium hydroxide............................ 80 grams (2 mols)

After heating for seven hours at 104° C., the charge was distilled until the vapor temperature reached 145° C. Four hundred grams of a 50% aqueous solution of sodium hydroxide were then added and the remainder of the amines distilled over. Upon distillation of the total aqueous distillate, a 43% yield of diethylene triamine was obtained, and a 5.5% yield of triethylene tetramine.

EXAMPLE 4

*Preparation of aminoisopropyl diethylamine*

The following materials were charged to a flask and refluxed at 68° to 74° C. for 24 hours.

Aminoisopropyl hydrogen sulfate............ 158 grams (1.0 mol)
Sodium hydroxide, 40%...................... 167 grams (2.05 mols)
Water...................................... 830 grams
Diethylamine............................... 130 grams (1.8 mols)

Upon distilling off the unreacted diethylamine, aminoisopropyl diethylamine was obtained as an azeotrope, with water, boiling at 95° to 98° C. Upon redistilling the azeotrope with sodium hydroxide and drying with sodium, aminoisopropyl diethylamine was obtained, boiling at 142° to 144° C., and having an equivalent weight of 66.5 (theoretical 65.1).

In the process of this invention, ammonia or any primary or secondary water-soluble amine may be employed, and the following list of suitable amines is in no sense exclusive:

*Aliphatic amines.*—Methyl amine, ethyl amine, diethyl amine, butyl amine, diethylene triamine, diethanolamine, isopropanolamine, diamino diethyl ether, sodium glycinate.

*Cyclic amines.*—Morpholine, piperazine.

Modifications of the invention other than as disclosed in the examples, and its applicability to the production of polyamines from basic nitrogen compounds other than those mentioned above, will be apparent to those skilled in the art, and are included within the scope of the invention.

I claim:

1. Process for preparing N-(beta-aminoalkyl) amines which comprises reacting a beta-aminoalkyl hydrogen sulfate with one of the group consisting of ammonia, primary amines and secondary amines, in the presence of water and a water-soluble inorganic metal base.

2. Process for preparing N-(beta-aminoalkyl) amines which comprises reacting a beta-aminoalkyl hydrogen sulfate with a water-soluble primary amine in the presence of water and a water-soluble inorganic metal base.

3. Process for preparing N-(beta-aminoalkyl) amines which comprises reacting a beta-aminoalkyl hydrogen sulfate with ammonia in the presence of water and a water-soluble inorganic metal base.

4. Process for preparing N-(beta-aminoalkyl) amines which comprises reacting a beta-aminoalkyl hydrogen sulfate with one of the group consisting of ammonia, primary amines and secondary amines, in the presence of an aqueous solution of an alkali metal hydroxide.

5. Process for preparing N-(beta-aminoethyl) amines which comprises reacting beta-aminoethyl hydrogen sulfate with a water-soluble primary amine in the presence of an aqueous solution of an alkali metal hydroxide.

6. Process for preparing ethylene diamine which comprises reacting beta-aminoethyl hydrogen sulfate with ammonia in the presence of an aqueous solution of an alkali metal hydroxide.

7. Process for preparing hydroxyethyl ethylene diamine which comprises reacting beta-aminoethyl hydrogen sulfate with monoethanolamine in the presence of an aqueous solution of an alkali metal hydroxide.

8. Process for preparing diethylene triamine which comprises reacting beta-aminoethyl hydrogen sulfate with ethylene diamine in the presence of an aqueous solution of an alkali metal hydroxide.

9. Process for preparing N-(beta-aminoalkyl) amines which comprises reacting in aqueous solution, a beta-aminoalkyl hydrogen sulfate with one of the group consisting of ammonia, primary amines and secondary amines in the presence of not substantially more than two mols of a water-soluble inorganic metal base to each mol of the beta-aminoalkyl hydrogen sulfate.

10. Process for making ethylene diamine which comprises reacting in aqueous solution, beta-aminoethyl hydrogen sulfate with ammonia and about two mols of sodium hydroxide per mol of the beta-aminoethyl hydrogen sulfate.

ALEXANDER L. WILSON.